United States Patent
Yang et al.

(10) Patent No.: US 11,418,832 B2
(45) Date of Patent: Aug. 16, 2022

(54) VIDEO PROCESSING METHOD, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventors: Hai Yang, Guangdong (CN); Jie Hu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/332,379

(22) Filed: May 27, 2021

(65) Prior Publication Data

US 2021/0289250 A1  Sep. 16, 2021

Related U.S. Application Data

(63) Continuation of application No. PCT/CN2019/109996, filed on Oct. 8, 2019.

(30) Foreign Application Priority Data

Nov. 27, 2018 (CN) .......................... 201811428036.4

(51) Int. Cl.
*H04N 21/442* (2011.01)
*H04N 21/81* (2011.01)
(Continued)

(52) U.S. Cl.
CPC ... *H04N 21/42653* (2013.01); *H04N 21/4183* (2013.01); *H04N 21/4312* (2013.01);
(Continued)

(58) Field of Classification Search
None
See application file for complete search history.

(56) References Cited

U.S. PATENT DOCUMENTS

2011/0280307 A1* 11/2011 MacInnis ............... H04N 19/42
375/240.15
2012/0176546 A1 7/2012 Yoon
(Continued)

FOREIGN PATENT DOCUMENTS

CN 101577110 B 4/2012
CN 105635782 A 6/2016
(Continued)

OTHER PUBLICATIONS

Chinese First office action with English Translation of Chinese Application No. 201811428036.4 dated Oct. 24, 2019 (17 pages).
(Continued)

*Primary Examiner* — Brian T Pendleton
*Assistant Examiner* — Jean D Saint Cyr
(74) *Attorney, Agent, or Firm* — Young Basile Hanlon & MacFarlane, P.C.

(57) ABSTRACT

Disclosed are a video processing method an electronic device and a computer-readable storage medium. The electronic device includes a display screen. The video processing method includes: obtaining an audio stream and a video stream by parsing a video file; wherein the video file is an online video; generating a subtitle stream based on the audio stream; obtaining a target video stream by synthesizing the subtitle stream and the video stream; and displaying the target video stream on the display screen.

17 Claims, 8 Drawing Sheets

(51) Int. Cl.
*H04N 21/426* (2011.01)
*H04N 21/418* (2011.01)
*H04N 21/431* (2011.01)
*H04N 21/439* (2011.01)
*H04N 21/488* (2011.01)

(52) U.S. Cl.
CPC ..... *H04N 21/4394* (2013.01); *H04N 21/4884* (2013.01); *H04N 21/812* (2013.01)

(56) References Cited

U.S. PATENT DOCUMENTS

| | | | |
|---|---|---|---|
| 2012/0301109 | A1 | 11/2012 | Kobayashi |
| 2013/0021371 | A1* | 1/2013 | Ueno .................. G06T 1/20 345/522 |
| 2015/0082349 | A1* | 3/2015 | Ishtiaq ............... H04N 21/4828 725/40 |
| 2015/0312649 | A1* | 10/2015 | Gopalan ............ H04N 21/8133 725/32 |
| 2018/0174612 | A1 | 6/2018 | Schulz |
| 2019/0297388 | A1* | 9/2019 | Panchaksharaiah ......... H04N 21/4333 |

FOREIGN PATENT DOCUMENTS

| | | |
|---|---|---|
| CN | 105704538 A | 6/2016 |
| CN | 105933724 A | 9/2016 |
| CN | 106131550 A | 11/2016 |
| CN | 106385548 A | 2/2017 |
| CN | 106792145 A | 5/2017 |
| CN | 106961628 A | 7/2017 |
| CN | 108401192 A | 8/2018 |
| CN | 105791635 B | 9/2018 |
| CN | 109379628 A | 2/2019 |
| JP | 2010233019 A | 10/2010 |
| WO | 2012070534 A1 | 5/2012 |

OTHER PUBLICATIONS

Chinese second office action with English Translation of Chinese Application No. 201811428036.4 dated Mar. 30, 2020 (16 pages).
Chinese third office action with English Translation of Chinese Application No. 201811428036.4 dated Aug. 7, 2020 (10 pages).
Notification to Grant Patent Right for Invention with English Translation for Chinese Application No. 201811428036.4, dated Nov. 5, 2020 (6 pages).
International search report with English Translation of PCT/CN2019/109996 dated Dec. 31, 2019 (16 pages).
Communication pursuant to Rule 164(1) EPC for EP Application 19890262.9 dated Mar. 14, 2022. (14 pages).
Extended European Search Report for EP Application 19890262.9 dated Jun. 14, 2022. (12 pages).

* cited by examiner

_(54)_ VIDEO PROCESSING METHOD, ELECTRONIC DEVICE AND COMPUTER-READABLE STORAGE MEDIUM

CROSS-REFERENCE TO RELATED APPLICATION(S)

The present application is a continuation-application of International (PCT) Patent Application No. PCT/CN2019/109996, filed on Oct. 8, 2019, which claims priority of Chinese Patent Application No. 201811428036.4, filed on Nov. 27, 2018, the entire contents of both of which are hereby incorporated by reference.

TECHNICAL FIELD

The present disclosure relates to the field of video processing technologies, and in particular to a video processing method, an electronic device and a computer-readable storage medium.

BACKGROUND

With the development of electronic technologies and information technologies, more and more devices have the ability of playing videos. During the video playing process, the devices are required to perform operations such as decoding, rendering, and compositing the video before displaying on the display screen. However, some videos are played without subtitles, such that viewers may miss some important information and user experience may be thus affected.

SUMMARY

The present disclosure provides a video processing method, an electronic device and a computer-readable storage medium to improve the above defects.

In a first aspect, embodiments of the present disclosure provide a video processing method for an electronic device. The electronic device includes a display screen. The video processing method includes: obtaining an audio stream and a video stream by parsing a video file; wherein the video file is an online video; generating a subtitle stream based on the audio stream; obtaining a target video stream by synthesizing the subtitle stream and the video stream; and displaying the target video stream on the display screen.

In a third aspect, embodiments of the present disclosure provide an electronic device, including: a display screen; at least one processor; and at least one memory including program code; the at least one memory and the program code configured to, with the at least one processor, cause the electronic device to perform the method as described above.

In a fourth aspect, embodiments of the present disclosure provide a computer-readable medium including program code stored thereon for performing at least the method as described above.

BRIEF DESCRIPTION OF DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For a person skilled in the art, other drawings can be obtained based on these drawings without creative work.

DETAILED DESCRIPTION

In order to enable a person skilled in the art to better understand the solutions of the present disclosure, the technical solutions in the embodiments of the present disclosure will be described clearly and completely in conjunction with the accompanying drawings in the embodiments of the present disclosure.

Figure 1:
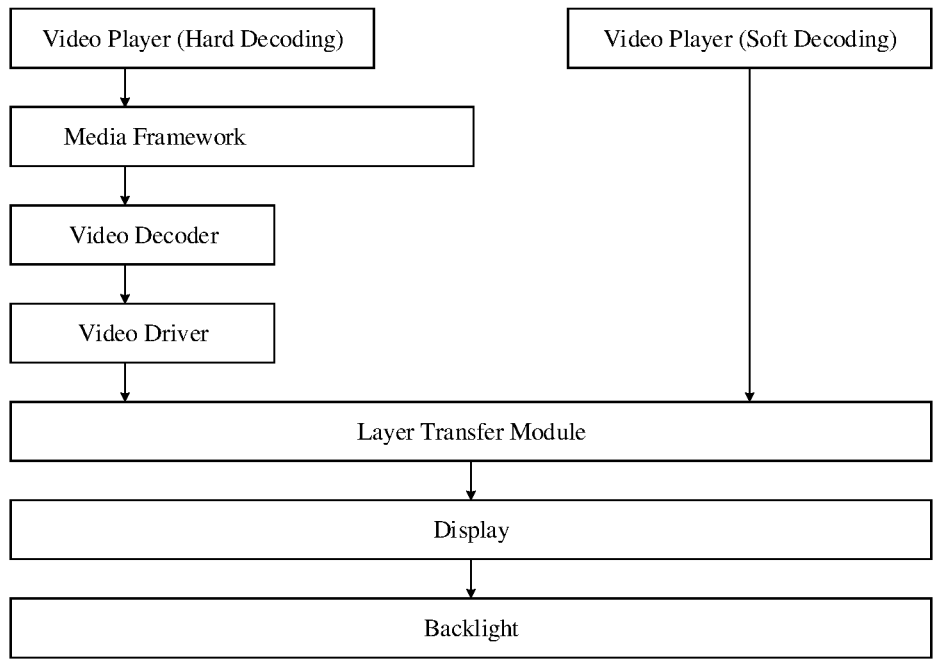
FIG. 1 is a block view of a video playing architecture according to an embodiment of the present disclosure.

Referring to FIG. 1, FIG. 1 is a block view of a video playing architecture according to an embodiment of the present disclosure. Specifically, when an operating system obtains data to be played, a next operation may be to parse the audio and video data. General video files are composed of two parts: video stream and audio stream. Different video formats have different audio and video packaging formats. The process of synthesizing audio streams and video streams into files is called muxer, and the process of separating audio streams and video streams from media files is called demuxer. To play a video file, the audio stream and video stream shall be separated from the file stream and decoded respectively. The decoded video frame may be directly rendered. The decoded audio frame may be sent to a buffer of an audio output device for playing. Of course, time stamps of video rendering and audio playing must be controlled in synchronization.

Specifically, the video decoding may include hard decoding and soft decoding. The hard decoding is to transfer a part of the video data that was originally processed by a central processing unit (CPU) to a graphics processing unit (GPU) to process. The parallel computing power of GPU is much higher than that of CPU, such that the load on the CPU may be greatly reduced. After the CPU occupancy rate is lower, some other programs may run at the same time. Of course, for better processors, such as i52320, or any quad-core processor from AMD, hard decoding and soft decoding are selected according to requirements.

Specifically, as shown in FIG. 1, a media framework obtains the video file to be played by a client through an API interface with the client, and sends the video file to be played to a video decoder. The media framework is a multimedia framework in the Android system. MediaPlayer, MediaPlayerService and Stagefrightplayer constitute the basic framework of Android multimedia. The media framework is adopted with a C/S structure. MediaPlayer serves as a Client side of the C/S structure. MediaPlayerService and Stagefrightplayer serve as a Server side of the C/S structure for the responsibility of playing multimedia files. The Server side completes request of the client side and makes response through Stagefrightplayer. Video Decode is a super decoder that integrates the most commonly used audio and video decoding and playing to decode video data.

The soft decoding is to cause the CPU to decode the video through software, and then invoke the GPU to render and merge the video and display the video on the display screen. Whereas the hard decoding refers to independent completion of video decoding tasks through dedicated daughter card equipment without the participation of the CPU.

Whether it is hard or soft decoding, after decoding the video data, the decoded video data will be sent to a layer transfer module (SurfaceFlinger). The decoded video data will be rendered and synthesized by SurfaceFlinger, and then displayed on the display. SurfaceFlinger is an independent Service for receiving all Surfaces of Window as input, calculating a position of each Surface in the final composite image based on parameters such as ZOrder, transparency, size, and position, submitting the position to HWComposer or OpenGL to generate a final display Buffer, and then displaying the final display Buffer to a specific display device.

As shown in FIG. 1, in the soft decoding, the CPU decodes the video data and submits the decoded video data to SurfaceFlinger for rendering and synthesis. While in the hard decoding, after decoding by the GPU, the decoded video data is submitted to SurfaceFlinger for rendering and synthesis. SurfaceFlinger invokes the GPU to achieve image rendering and synthesis, and display on the display screen.

Figure 2:
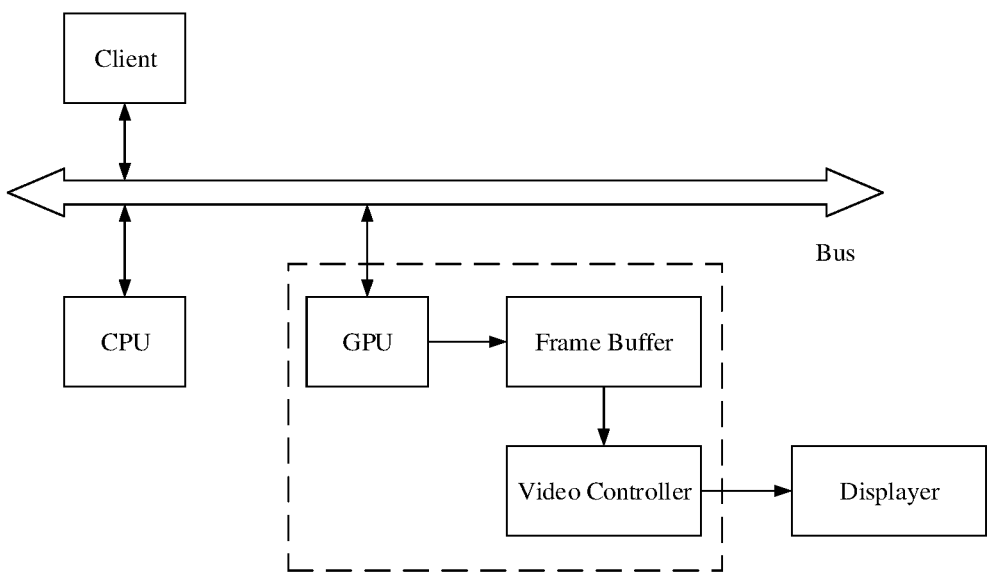
FIG. 2 is a block view of an image rendering architecture according to an embodiment of the present disclosure.

In some embodiments, an image rendering process is shown in FIG. 2. The CPU obtains the video file to be played sent by the client, obtains the decoded video data after decoding, and sends the video data to the GPU. After the GPU completes rendering, the GPU submits rendered result into a frame buffer. Then a video controller reads the data in the frame buffer line by line based on a HSync signal, and pass the data to the display screen after digital-analog conversion.

When a user uses an electronic device to play some video files without subtitles, and the environment is noisy or the sound of the video is too low, the user may miss some video content due to the lack of subtitles. For example, some dialogues in the video may not be heard clearly, thereby reducing user experience. For some voices that the user cannot understand, for example, the dialogue in the video file being in a certain dialect or foreign language, the user experience will be extremely poor.

Figure 3:
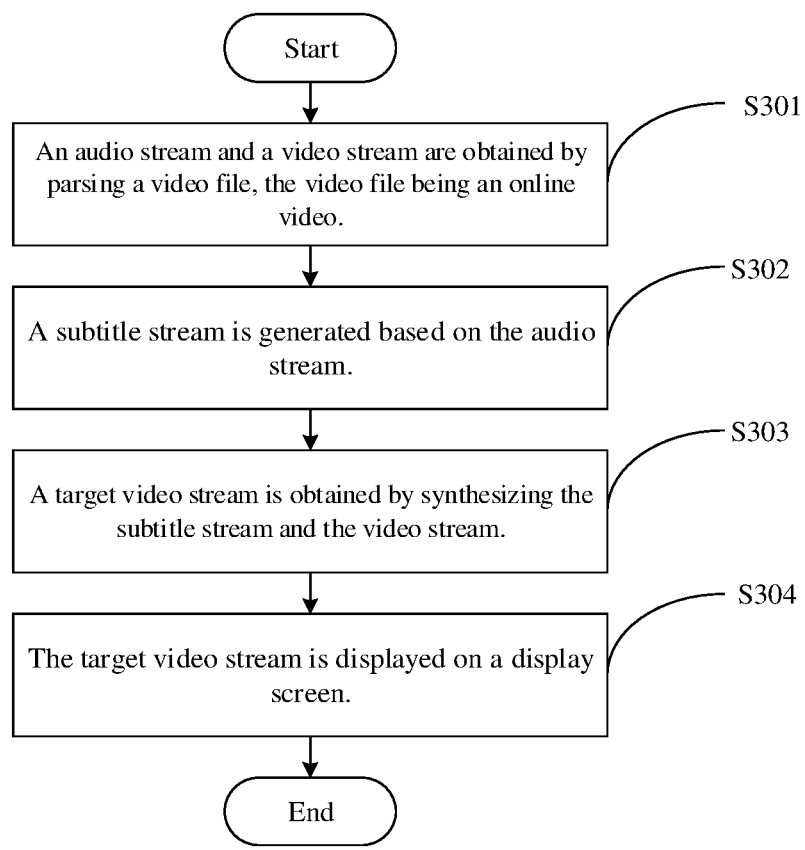
FIG. 3 is a flowchart of a video processing method according to an embodiment of the present disclosure.

Therefore, in order to overcome the foregoing drawbacks, as shown in FIG. 3, embodiments of the present disclosure provides a video processing method applied to an electronic device. The electronic device further includes a screen. In the embodiments of the present disclosure, the method includes operations at blocks S301 to S304.

At block S301: An audio stream and a video stream are obtained by parsing a video file, the video file being an online video.

The video file may refer to a video file to be played, indicating that the video file is planned to be played. The video file to be played is an online video, and the video to be played is an online video data. The online video data corresponds to a video file. The online video data is data that the video file has been sent to the electronic device. For example, if the video file is a movie, and the electronic device receives data with a playing time of the movie from 0 to 10 minutes, then the online video data corresponding to the movie is the data with the playing time of the movie from 0 to 10 minutes.

Specifically, the specific implementation manner of parsing the video file to be played to obtain the audio stream and the video stream may be: obtaining the video file to be played; parsing the video file to be played to obtain the audio stream and the video stream.

In some embodiments, the electronic device includes a plurality of clients capable of playing video files. Each client has a video list interface. The video list interface of the client displays display content corresponding to multiple videos. The display content corresponding to the multiple videos includes a thumbnail corresponding to each video. The thumbnail may be configured as a touch button. When the user clicks on the thumbnail, the client may detect the thumbnail selected by the user and determine the online video file to be played.

In response to the video selected by the user in the video list, the client enters a video playing interface. When a play button on the playing interface is clicked, the client may detect what type of video the user is currently clicking on by monitoring the touch operation from the user. Specifically, the play button is configured with a preset attribute. When the preset attribute of the play button corresponding to the obtained touch operation is detected, the video to be played selected by the user can be determined.

When the electronic device obtains an identifier of the video file to be played, the electronic device searches for the identifier in the local storage space of the electronic device based on the identifier. When the identifier is included, the video file to be played is determined to be stored locally. When the identifier is not included, the video file to be played is downloaded from a server corresponding to a network address corresponding to the identifier.

The processor invokes a play module to parse the video file to be played, thereby obtaining the video stream and audio stream corresponding to the video file to be played. The play module may be MediaExtractor module in the Android system or FFmpeg module. The FFmpeg module is an open source cross-platform video and audio streaming framework. The FFmpeg module belongs to free software and adopts LGPL or GPL licenses (depending on the selected component). The FFmpeg module provides a complete solution for recording, converting, and streaming audio and video. The FFmpeg module contains a rich audio/video codec library libavcodec.

At block S302: A subtitle stream is generated based on the audio stream.

Specifically, text information of speech data in the audio stream may be extracted. Specifically, the speech signal may be first processed to obtain features of the sample. Then the features of the sample may be sent to a statistical model to obtain the output text information. The statistical model may be a model based on Hidden Markov Theory and configured to classify the sample features and determine which text the sample belongs to.

In some embodiments, the user may input voice information through a voice assistant via the client in the electronic device, and the electronic device directly processes the voice information.

In some embodiments, the user may send voice information to the server through a voice assistant via the client in the electronic device, and the server processes the voice information.

In addition, a specific implementation manner of generating the subtitle stream based on the audio stream may be: determining whether a type of the video file to be played is a live video; and in response to the type of the video file to be player being a live video, generating the subtitle stream based on the audio stream. The determining whether the type of the video file to be played is a live video may include: determining whether the video file to be played is from a certain live broadcast room in the video list of the client. For example, in a case that the client has a function of playing live video, then the video list may be the thumbnails corresponding to each live broadcast room. After the user clicks on a live broadcast room, the corresponding video in the live broadcast room is the video file to be played. Therefore, since the live broadcast video cannot be rewinded, when the user can see the subtitles corresponding to the anchor's voice when watching the live video, user experience may be improved and the user may not miss any information.

After the electronic device obtains the text information corresponding to the audio stream, the electronic device may correspond each text to a time point based on the time point corresponding to each voice in the audio stream. Each time point corresponds to a frame of image. Therefore, the electronic device may generate the subtitles corresponding to the frame of image from multiple texts corresponding to the unified frame of image, and then the subtitle stream is produced.

In addition, a subtitle client with a subtitle production function may be installed in the electronic device. After the electronic device obtains the audio stream, the electronic device may import the audio stream to the subtitle client to obtain the subtitle stream.

At block S303: A target video stream is obtained by synthesizing the subtitle stream and the video stream.

The most basic type of subtitle superimposition is performed on a static image. Generally, a standard string is directly output on the image to synthesize a new image frame. While the subtitle superimposition on a video is performed on a continuous image frame sequence. The superimposition on a single frame is similar to the superimposition on the static image. The karaoke subtitles superimposition mentioned in this specification is a kind of subtitles superimposition on the video.

Specifically, multiple subtitle pictures in the subtitle stream are superimposed on the corresponding image frames in the video stream one by one to form a new image frame. The new multiple image frames and the playing time point are synthesized to form the target video stream.

At block S304: The target video stream is displayed on a display screen.

The target video stream is displayed on the display screen frame by frame based on the refresh frequency of the display screen.

Specifically, the processor may send the subtitle stream and the video stream to the frame buffer shown in FIG. 2 to synthesize the target video stream, and display an image in the target video stream corresponding to a frame in the frame buffer frame by frame on the display screen based on the refresh frequency of the display screen.

The refresh frequency of the display screen is a frequency at which the images are updated on the display screen, that is, the number of times the images on the display screen appear per second. After the electronic device obtains the online video data to be played, the electronic device decodes the online video data to obtain the corresponding multi-frame image data and store the image data in the frame buffer. Then the electronic device reads the multi-frame image data from the frame buffer frame by frame according to the refresh frequency of the display screen, and displays the data on the display screen after rendering and synthesizing.

Figure 4:
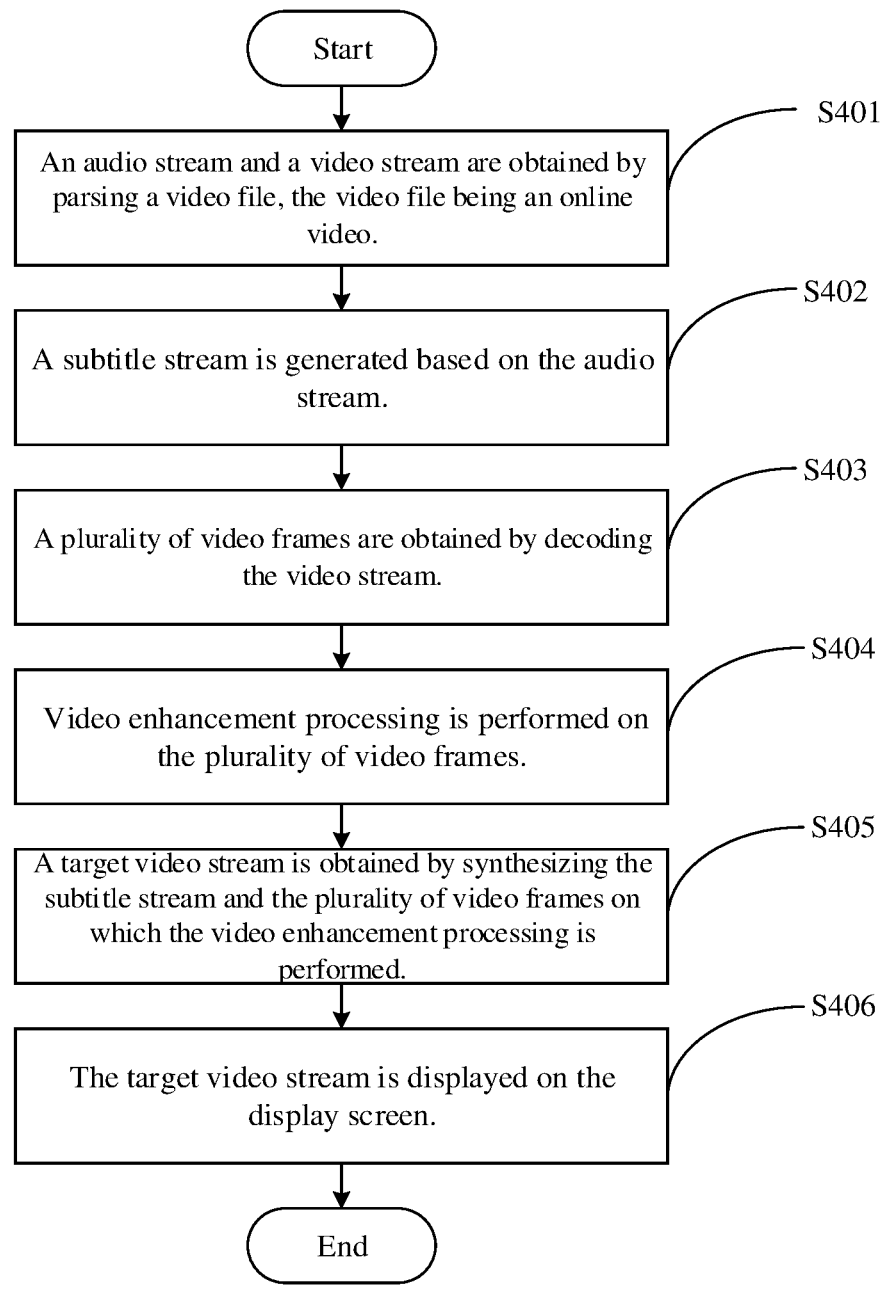
FIG. 4 is a flowchart of a video processing method according to another embodiment of the present disclosure.

In addition, considering the visual effect, video enhancement processing may be performed on the video stream. Specifically, as shown in FIG. 4, the method may include operations at blocks S401 to S406.

At block S401: An audio stream and a video stream are obtained by parsing a video file, the video file to be played being an online video.

At block S402: A subtitle stream is generated based on the audio stream.

At block S403: A plurality of video frames are obtained by decoding the video stream.

Specifically, the above-mentioned soft decoding or hard decoding may be applied to decode the video file. After decoding, the multiple video frames to be rendered corresponding to the video file may be obtained.

After obtaining the video stream and the audio stream, the type of the video stream and the type of the audio stream may be determined by obtaining the extension of the video stream and that of the audio stream. A video decoder may be configured for the video stream based on the type of the video stream.

A first corresponding relationship between the type of video stream and the identifier of the video decoder may be obtained in advance. The first corresponding relationship may be configured based on manual input by the user. For example, the corresponding relationship may be input based on introduction of a video decoder that has been determined to be capable of decoding video files of the type. For example, the first corresponding relationship may be obtained in a network server. The network server counts the identifiers of decoders that can decode each type of video stream.

In some embodiments, in response to the video selected by the user in the video list, the client enters a video playing interface. When a play button on the playing interface is clicked, the client may detect what type of video the user is currently clicking on by monitoring the touch operation from the user. Then the client sends the video file to the CPU, and the CPU decides to decode the video file by hard decoding or soft decoding.

At block S404: Video enhancement processing is performed on the plurality of video frames.

The performing the video enhancement processing on the plurality of video frames specifically includes: optimizing image parameters of the plurality of video frames. The optimizing image parameters is configured to optimize the video quality on the multiple video frames. The video quality includes video clarity, sharpness, lens distortion, color, resolution, color gamut range, purity, and other parameters that determine the video viewing effect. The combination of different parameters can achieve different display enhancement effects. For example, the effect of barrel distortion is achieved with the position of the portrait as the center, and the color of the current picture is modified to gray, which can create a horrible atmosphere effect.

In the embodiments of the present disclosure, the optimizing image parameters includes at least one of exposure enhancement, denoising, edge sharpening, contrast increase, or saturation increase.

The exposure enhancement is configured to increase the brightness of the image. The brightness value of an area at which the brightness value is bottomed may be increased through a histogram of the image. In addition, the brightness of the image may also be increased by non-linear superposition. Specifically, I represents a relatively dark image to be processed, T represents a relatively bright image after processing, and the exposure enhancement method is $T(x)=I(x)+(1-I(x))*I(x)$. T and I are both images with values of [0, 1]. The algorithm may be iterated multiple times if the enhancement effect is not good once.

The denoising of image data is configured to remove noise of the image. Specifically, the image is often disturbed and affected by various noises during the generation and transmission process, and the image quality is affected, which has an adverse effect on subsequent image processing and image visual effects. There are many types of noise, such as electrical noise, mechanical noise, channel noise and other noises. Therefore, the image must be denoised to suppress noise, improve image quality, and facilitate higher-level processing. Judging from the probability distribution of noise, the noise can be divided into Gaussian noise, Rayleigh noise, gamma noise, exponential noise and uniform noise.

Specifically, the image may be denoised through a Gaussian filter. The Gaussian filter is a linear filter capable of effectively suppressing noise and smoothing the image. The principle of the Gaussian filter is similar to that of a mean filter, and both to take a mean value of pixels in the filter window as an output. A coefficient of a window template of the Gaussian filter is different from that of the mean filter. The template coefficient of the mean filter is always the same as 1. The template coefficient of the Gaussian filter decreases as the distance from the center of the template increases. Therefore, the Gaussian filter has a smaller degree of blurring of the image compared to the mean filter.

For example, a 5×5 Gaussian filter window is generated, and the center position of the template is configured as the origin of coordinates for sampling. The coordinates of each position of the template are brought into the Gaussian function, and the value obtained is the coefficient of the template. Then the Gaussian filter window is convolved with the image to denoise the image.

The edge sharpening is configured to make blurred images clearer. There are generally two methods for image sharpening: one is differentiation and the other is high-pass filtering.

The contrast increase is configured to enhance the image quality of the image, such that the colors in the image are more vivid. Specifically, contrast stretching is a method of image enhancement also belongs to a grayscale transformation operation. Through the grayscale transformation, the grayscale value is stretched to the entire 0-255 interval, then the contrast is obviously enhanced. The following formula may be applied to map the gray value of a pixel to a larger gray space:

$$I(x,y)=[(I(x,y)-I\min)/(I\max-I\min)](MAX-MIN)+MIN;$$

where Imin and Imax are the minimum and maximum gray values of the original image, and MIN and MAX are the minimum and maximum gray values of the gray space to be stretched.

Figure 5:
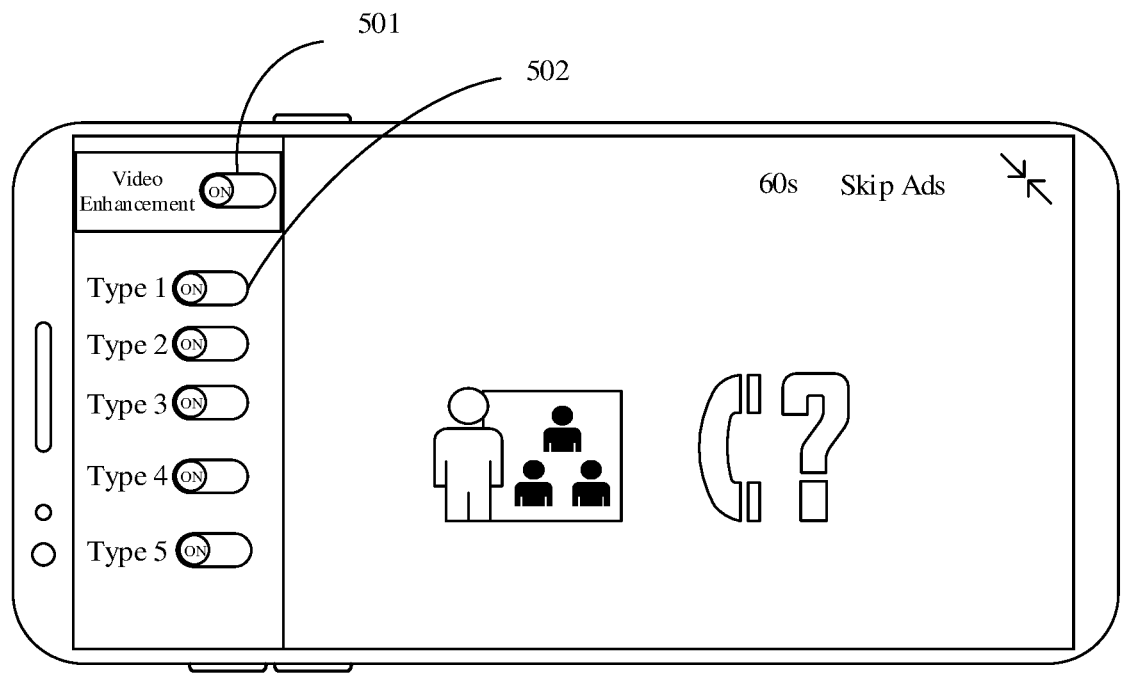
FIG. 5 is a schematic view of a selection interface for a type to be optimized according to an embodiment of the present disclosure.

Specifically, the user may configure a type to be optimized for the video file to be played in the electronic device. The type to be optimized may be a type of the target, such as male, female, sky, mountain, river, or signboard. Specifically, the user may input the type to be optimized in the video playing interface. As shown in FIG. 5, a main switch 501 for video enhancement and sub-switches 502 for each target type are displayed on the video interface. Specifically, the main switch 501 for video enhancement is configured to turn on or off the video enhancement function. The video enhancement function is configured to optimize the image data of the video file. When the main switch 501 for video enhancement is turned on, the user may choose to turn on one or some sub-switches 502 for target types. As shown in FIG. 5, Type 1 corresponds to a target type, such as male, and Type 2 corresponds to another target type, such as female. Type 1 and Type 2 are example text. Specifically, in actual use, the text may be changed according to specific target types, for example, Type 1 may be changed to a male character.

When the main switch 501 for video enhancement is turned on, the user may select to turn on the type of the target to be optimized that is wished to be optimized. That is, the user may select to turn on the sub-switch 502 of the type that is wished to be optimized. The electronic device may then obtain the type to be optimized of the video file.

When the main switch 501 for video enhancement is turned off, the sub-switches 502 corresponding to each type in the selection window of the type to be optimized are grayed out, that is, they cannot be selected to be turned on or off. Or to say, the sub-switches 502 do not respond to any operation towards the sub-switches by applications.

Figure 6:
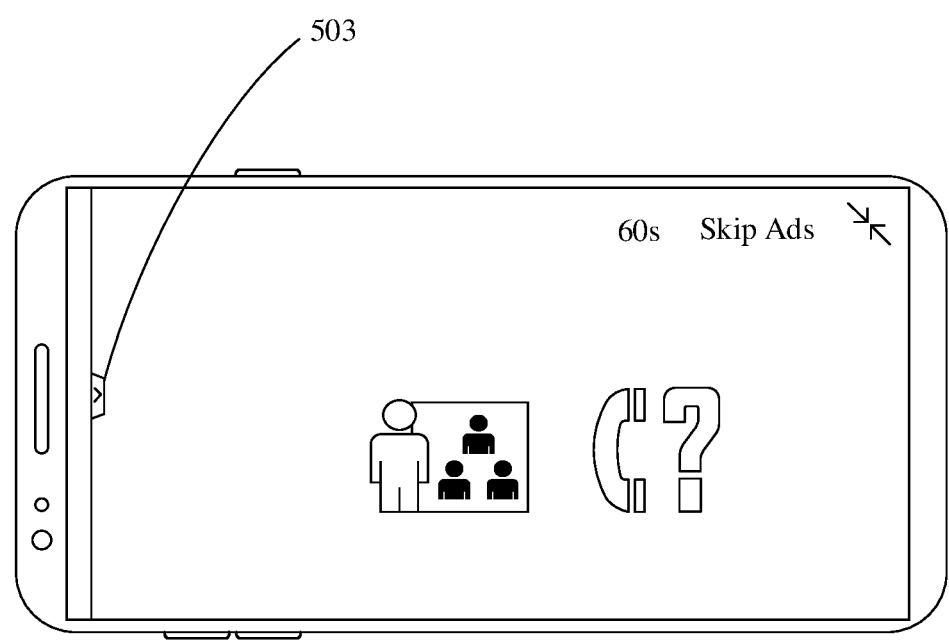
FIG. 6 is a schematic view of a hiding effect of a selection interface for a type to be optimized according to an embodiment of the present disclosure.

In addition, the selection interface of the type to be optimized shown in FIG. 5 may be hidden. Specifically, as shown in FIG. 6, a sliding button 503 may be configured on a side of the selection window of the type to be optimized. The selection window of the type to be optimized may hide and slide out through the sliding button 503. In some embodiments, when the selection window of the type to be optimized is in a hidden state, the sliding button 503 may be clicked to slide out the selection window of the type to be optimized. When the selection window of the type to be optimized is in a presenting state, the sliding button 503 may be clicked to hide the selection window of the type to be optimized.

In addition, when selecting the type to be optimized, the user may input an indication of a degree of optimization. Based on the indication of the degree of optimization, the degree of optimization of the type to be optimized may be adjusted. For example, when the exposure enhancement is selected, the user may input an indication of a degree of the exposure enhancement, e.g., through the input interface or pressing the volume key. In an example, each press of the volume up key will increase the exposure level by 2%, and correspondingly, each press of the volume down key will reduce the exposure level by 2%. In this way, the user may freely adjust the degree of optimization.

At block S405: A target video stream is obtained by synthesizing the subtitle stream and the plurality of video frames on which the video enhancement processing is performed.

At block S406: The target video stream is displayed on the display screen.

As a result, the subtitles may be displayed when playing online videos, and the video may be optimized to achieve super-clear visual effects.

Figure 7:
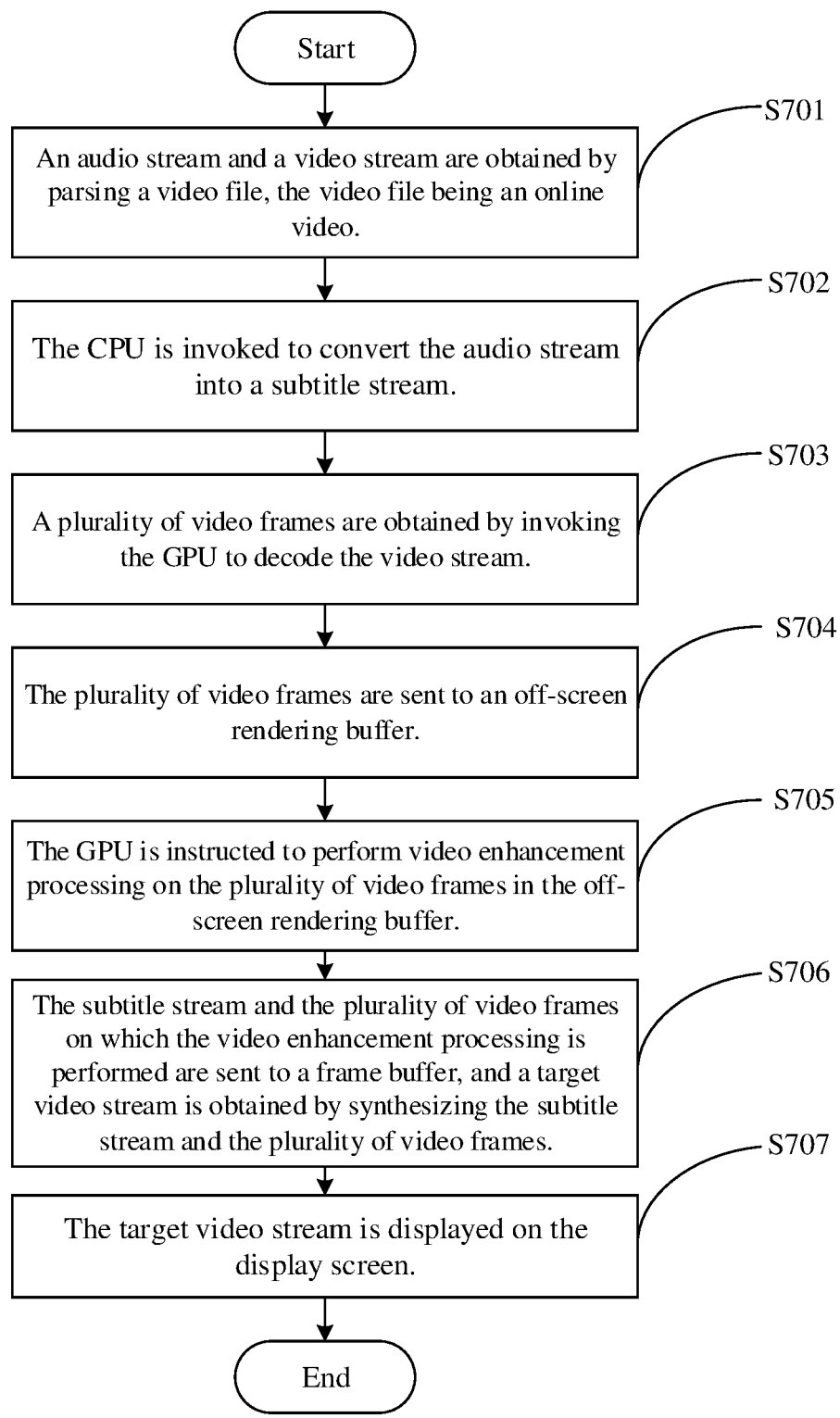
FIG. 7 is a flowchart of a video processing method according to further another embodiment of the present disclosure.

In addition, in the embodiments of the present disclosure, the processor may include a central processing unit (CPU) and a graphics processing unit (GPU). The CPU may execute the above method. Considering that when playing online videos, if the video processing speed is too slow, which may cause stutters during the video playing process, the CPU and the GPU may be divided into labor for processing. Specifically, as shown in FIG. 7, the method includes operations at blocks S701 to S707.

At block S701: An audio stream and a video stream are obtained by parsing a video file, the video file being an online video.

At block S702: The CPU is invoked to convert the audio stream to a subtitle stream.

Specifically, the electronic device may include a subtitle production module stored in a memory of the electronic device. When the electronic device is required to execute the conversion of the audio stream to the subtitle stream, the client sends an instruction to the CPU. The instruction instructs the CPU to invoke the subtitle production module to convert the audio stream to the subtitle stream. Specifically, the subtitle production module may be a program module or a circuit unit installed in the CPU.

At block S703: A plurality of video frames are obtained by invoking the GPU to decode the video stream.

Specifically, the decoding method includes hard decoding and soft decoding. The client may select hard decoding or soft decoding to decode the video file.

In the embodiments of the present disclosure, the video stream is decoded by hard decoding to obtain the multiple video frames. That is, a hardware module of the GPU is invoked to decode the video stream to obtain the multiple video frames.

In addition, when the GPU is processing a high-resolution video, the processing speed is significantly better than the CPU. As for low-resolution videos, the processing efficiency is very fast. That is, time consumed in the video enhancement process for low-resolution videos is very small, then either the CPU or the GPU may be configured for processing. Therefore. the invoking the GPU to decode the video stream to obtain a plurality of video frames may include: obtaining a resolution of the video file to be played; determining whether the resolution is greater than a first preset resolution; in response to the resolution being greater than the first preset resolution, invoking the GPU to decode the video stream to obtain the plurality of video frames; and in response to the resolution being less than or equal to the first preset resolution, invoking the GPU or the CPU to decode the video stream to obtain the plurality of video frames.

The resolution of the video file reflects the image size of each frame of the video file to be played. The first preset resolution may be configured according to actual use, for example, the first preset resolution may be 1280×720. When the resolution of the video file to be played is greater than the resolution of 1280×720, the GPU is invoked to decode the video stream to obtain the multiple video frames. When the resolution of the video file to be played is less than or equal to the resolution of 1280×720, the CPU or GPU may be applied. That is, in cases of high resolution, GPU is more recommended. In cases of low resolution, the CPU and GPU may be applied arbitrarily.

In addition, when the CPU is playing video files, the CPU is required to both process the video files and to execute other operation instructions of other electronic devices. Each application program takes up certain resources of the CPU, that is, the utilization of the CPU is occupied. In this way, the CPU is now overloaded and not suitable for processing video files. Specifically, the above method may further include: in response to the resolution being less than or equal to the first preset resolution, obtaining a utilization rate of the CPU; determining whether the utilization rate of the CPU is less than a preset value; and in response to the utilization rate of the CPU being less than the preset value, obtaining the plurality of video frames by invoking the GPU to decode the video stream.

Specifically, the utilization rate of the CPU may be obtained by viewing the task manager of the electronic device. For example, in the Android system, the utilization rate of the CPU may be obtained through adb shell top command. The preset value may be a utilization rate set based on the configuration from the user. For example, the preset value may be 60%. Assuming that the current utilization rate of the CPU is 40%, which is less than 60%, then the utilization rate of the CPU is determined to be less than the preset value. When the current utilization rate of the CPU is 70%, which is greater than 60%, then the utilization rate of the CPU is determined to be greater than the preset value.

When the utilization rate of the CPU is less than the preset value, it means that the current CPU resources are relatively rich, and the CPU may be applied to process the video file to be played. When the utilization rate of the CPU is greater than or equal to the preset value, it means that the current resources of the CPU are scarce, and the CPU may not be applied to process the video file to be played.

In addition, since the utilization rate of the CPU is the sum of the utilization rates of the currently launched applications, the utilization rate of each currently launched application can be obtained. It may be determined whether an application matching a preset application exists among the currently launched applications. The preset application is an application that allows the system of the electronic device to close the application matching the preset application without authorization from the user. That is, the method may further include: determining that at least one of the currently launched applications is a preset application, wherein the preset application is capable of being closed by a system of the electronic device without authorization from a user. When the application matching the preset application exists, the application matching the preset application is closed, and then the current utilization rate of the CPU is obtained as the utilization rate of the CPU. Then the operation of determining whether the utilization rate of the CPU is less than a preset value is returned and executed.

Specifically, a list of preset applications is pre-stored in the electronic device. The list of preset applications includes a plurality of preset application identities. The preset applications are authorized by the user and allows the system to close the application matching the preset application without authorization from the user. Specifically, identification of the preset applications may be configured based on input from the user.

Application corresponding to each process in the current system process and the utilization rate of the CPU of each process may be scanned, and the current utilization rate of the CPU may be obtained. The application matching the preset application is searched for among all the scanned applications and configured as the application to be processed. The application to be processed may be closed and the process corresponding to the application to be processed may be killed. Then the utilization rate of the CPU after the process corresponding to the application to be processed is killed may be obtained as an updated utilization rate. The updated utilization rate is configured as the new utilization rate of the CPU. Whether the new utilization rate of the CPU is less than the preset value is determined. The determination result may be obtained as the determination result for this determining operation. When the determination result is that the new utilization rate of the CPU is less than the preset value, the GPU may be invoked to decode the video stream to obtain the multiple video frames. When the determination result is that the new utilization rate of the CPU is greater than or equal to the preset value, the GPU or CPU may be invoked to decode the video stream to obtain the multiple video frames.

It should be noted that, in some embodiments, when the GPU is selected to decode the video file to be played, the subsequent video enhancement processing of the multiple video frames corresponding to the video file to be played may be also executed by the GPU. When the CPU is selected to decode the video file to be played, the subsequent video enhancement processing of the multiple video frames corresponding to the video file to be played may be also executed by the CPU.

At block S704: The plurality of video frames are sent to an off-screen rendering buffer.

In some embodiments, an off-screen rendering buffer is configured in the GPU in advance. Specifically, the GPU may invoke a rendering client module to render and synthesize the multi-frame image data to be rendered and send the image data to the display screen for display. Specifically, the rendering client module may be an OpenGL module. The final position of the OpenGL rendering pipeline is in the frame buffer. The frame buffer is a series of two-dimensional pixel storage arrays, including color buffer, depth buffer, stencil buffer and accumulation buffer. By default, OpenGL applies the frame buffer provided by the window system.

An extension, GL_ARB_framebuffer_object, of OpenGL provides a way to create an additional frame buffer object (FBO). OpenGL can redirect the frame buffer originally drawn to the window to the FBO.

A buffer besides the frame buffer may be configured through the FBO. The buffer may refer to the off-screen rendering buffer. The obtained multiple video frames may be then stored in the off-screen rendering buffer. Specifically, the off-screen rendering buffer may be a storage space corresponding to the GPU. That is, the off-screen rendering buffer itself has no space for storing images, but after mapping with a storage space in the GPU, the images are is stored in a storage space in the GPU corresponding to the off-screen rendering buffer.

The multiple video frames may be bound to the off-screen rendering buffer, such that the multiple video frames can be stored in the off-screen rendering buffer. That is, the multiple video frames can be found in the off-screen rendering buffer.

At block S705: The GPU is instructed to perform video enhancement processing on the plurality of video frames in the off-screen rendering buffer.

Feature data corresponding to video enhancement algorithm may be convolved with the multiple video frames to be rendered to optimize the multiple video frames. Specifically, a rendering object and a data texture object may be rendered, such that the multiple video frames in the off-screen rendering buffer are optimized, which may refer to an operation of render to texture (RTT). The rendering object herein refers to the multiple video frames. Specifically, the multiple video frames may be stored in the FBO through the rendering object. The rendering object may be configured as a variable to assign the multiple video frames to the rendering object and bind the rendering object With the FBO. In this way, the multiple video frames can be stored in the off-screen rendering buffer. For example, a handle may be configured in the FBO, and the handle points to the multiple video frames. The handle may be a rendering object.

The video enhancement algorithm may be assigned to the texture object. The feature data corresponding to the video enhancement algorithm is the parameters of the video enhancement algorithm. For example, each parameter value of a median filter in denoising. The specific operation of the video enhancement algorithm may refer to the foregoing embodiments.

In some embodiments, an optimization strategy corresponding to the video file to be played may also be determined according to the resolution of the video file to be played.

Specifically, whether the resolution of the video file to be played is less than a second preset resolution may be determined. When the resolution of the video file to be played is less than the second preset resolution, a first optimization strategy is configured for the video file to be played. When the resolution of the video file to be played is greater than or equal to the second preset resolution, a second optimization strategy is configured for the video file to be played.

The first optimization strategy and the second optimization strategy may both include five optimization items: exposure enhancement, denoising, edge sharpening, contrast increase, and saturation increase. An optimization level of each optimization item corresponding to the first optimization strategy and the optimization level of each optimization item corresponding to the second optimization strategy are different. For example, the optimization level of exposure enhancement in the first optimization strategy is b1, the optimization level of denoising is q1, the optimization level of edge sharpening is r1, the optimization level of contrast increase is d1 and the optimization level of saturation increase is h1. In the second optimization strategy, the optimization level of exposure enhancement is b2, the optimization level of denoising is q2, the optimization level of edge sharpening is r2, the optimization level of contrast increase is d2, and the optimization level of saturation increase is h2. q1 is greater than q2, r1 is greater than r2, and h1 is less than h2. For example, each level may be represented with a value from 0-9. The greater the value, the higher the level, and the higher the degree of optimization. Taking exposure as an example, the higher the optimization level of exposure enhancement, the higher the brightness of the improved image. The optimization levels of denoising and edge sharpening in the first optimization strategy may be 8 and 9 respectively, and the optimization levels of denoising and edge sharpening in the second optimization strategy may be 3 and 4, respectively. When the resolution of the video frames of the video file to be played is less than the second preset resolution, denoising and edge sharpening are enhanced compared with the case in which the resolution of the video frames of the video file to be played is greater than or equal to the second preset resolution. Similarly, when the resolution of the video frames of the video file to be played is greater than or equal to the second preset resolution, saturation increase and details are enhanced compared with the case in which the resolution of the video frames of the video file to be played is less than the second preset resolution.

In other embodiments, whether the resolution of the video file to be played is less than the second preset resolution is determined. When the resolution of the video file to be played is less than the second preset resolution is determined, a third optimization strategy is configured for the optimization strategy of the video file to be played. When the resolution of the video file to be played is greater than or equal to the second preset resolution, a fourth optimization strategy is configured for the optimization strategy of the video file to be played. The third optimization strategy may include denoising and edge sharpening, and the fourth optimization strategy may include saturation increase.

At block S706: The subtitle stream and the plurality of video frames on which the video enhancement processing is performed are sent to a frame buffer, and a target video stream is obtained by synthesizing the subtitle stream and the plurality of video frames.

The frame buffer, as shown in FIG. 2, corresponds to the display screen and is configured to store data required to be displayed on the display screen. The frame buffer is a driver interface in the operating system kernel. Taking the Android system as an example, Linux is working in protected mode, therefore the user mode process cannot use an interrupt call provided in a graphics card BIOS to directly write the data and display it on the display screen like the DOS system. Linux abstracts the device as frame buffer, such that the user process may directly write data and display it on the display screen. The frame buffer mechanism imitates the function of the graphics card, and the video memory can be operated directly by reading and writing the frame buffer. Specifically, the frame buffer may be regarded as an image of the display memory. After the frame buffer is mapped to the process address space, read and write operations can be performed directly, and the written data can be displayed on the display screen.

The frame buffer may be regarded as a space for storing data. The CPU or GPU puts the data to be displayed into the frame buffer. The frame buffer itself does not have any ability to calculate data. The video controller reads the data in the frame buffer according to the refresh frequency of the display screen for display on the display screen.

Specifically, the rendering object may be bound to the frame buffer. The rendering object herein has been optimized by the video enhancement algorithm. That is, the rendering object is the optimized video frames of the video file to be played. Then, the optimized video frames of the video file to be played are sent to the frame buffer for storage.

Then, the video frames and subtitle stream of the video file to be played after the video enhancement are stored in the frame buffer. The CPU synthesizes the video frames and subtitle stream of the video file to be played in the frame buffer to obtain the target video stream.

At block S707: The target video stream is displayed on the display screen.

In some embodiments, the GPU reads the image data from the frame buffer frame by frame according to the refresh frequency of the display screen, and displays the image data on the display screen after rendering and synthesis processing.

Therefore, the multiple video frames of the video file to be played may be optimized through the off-screen rendering and then sent to the frame buffer, such that the data in the frame buffer is the data after video enhancement. Compared with the technical solution in which the multiple video frames are stored in frame buffer, and video enhancement operations are performed in the frame buffer, and then the subtitle stream is stored and synthesized with the video frame after the video enhancement in the frame buffer to obtain the target video stream, the technical solutions of the present disclosure can avoid situations that the multiple video frames in the frame buffer have not been optimized yet, but are directly displayed on the display screen due to the arrival of the refresh frequency of the display screen, which affects the user experience.

It should be noted that, for parts that are not described in detail in the foregoing operations, reference may be made to the foregoing embodiments, and details are not described herein again.

Figure 8:
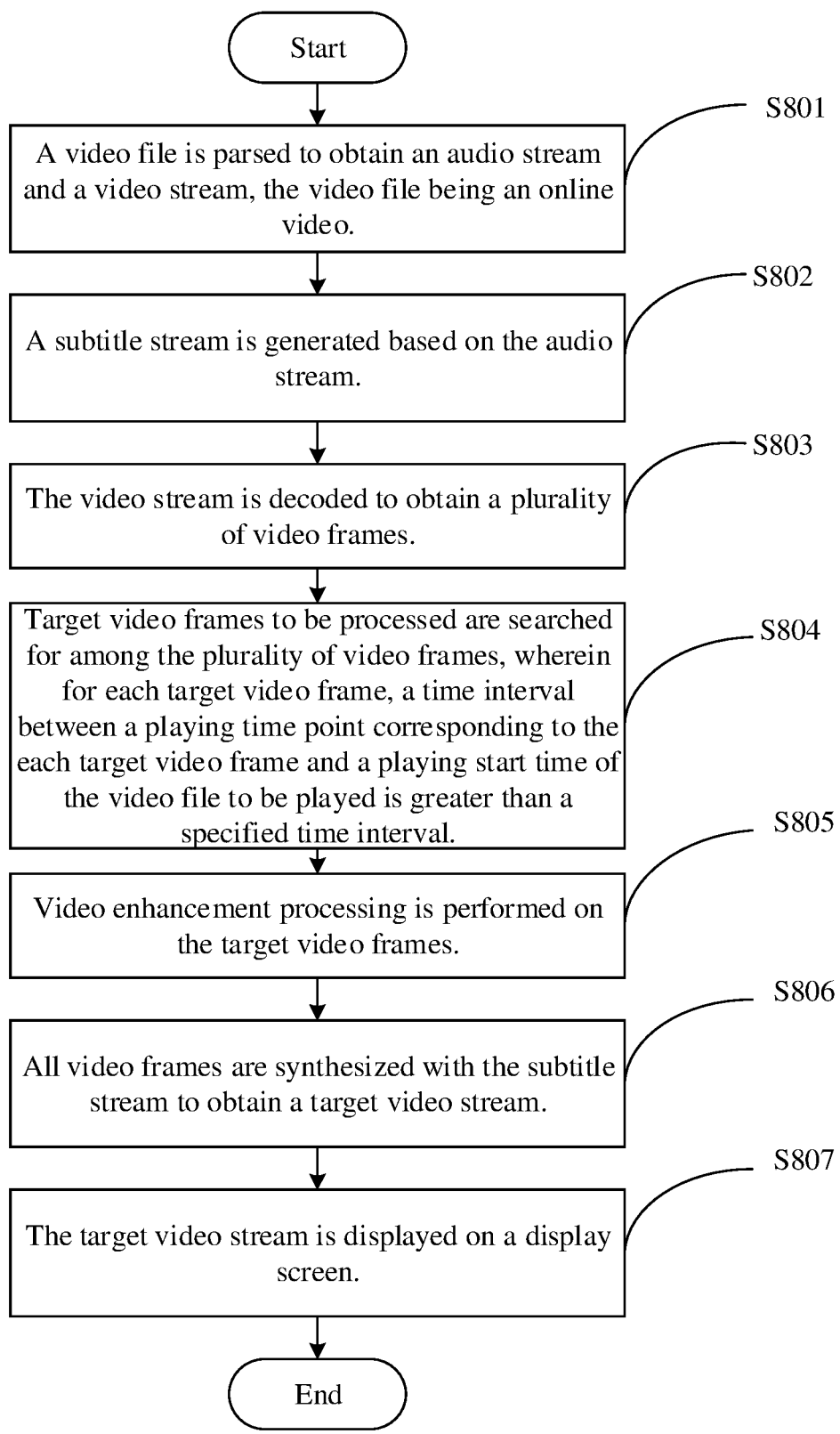
FIG. 8 is a flowchart of a video processing method according to further another embodiment of the present disclosure.

In addition, when the video is played, video content such as advertisement content and opening song are included before the time point of playing a main video. During the time period before playing the main video, video enhancement processing may not be performed. Specifically, referring to FIG. 8, the method may include operations at block S801 to S807.

At block S801: A video file is parsed to obtain an audio stream and a video stream, the video file to be played being an online video.

At block S802: A subtitle stream is generated based on the audio stream.

At block S803: The video stream is decoded to obtain a plurality of video frames.

At block S804: Target video frames are searched for among the plurality of video frames, wherein for each target video frame, a time interval between a playing time point of the each target video frame t and a playing start time of the video file to be played is greater than a preset time interval.

The target video frames may refer to video frames that are planned to be processed. The preset time interval may be a preset time interval. The time length of the preset time interval is greater than an advertisement playing time. Specifically, the advertisement playing time may be a longest time period experienced by previously added advertising content played by a client before playing videos, the client being capable of playing the video file to be played. For example, within a certain period of time, the duration of the added advertising content for each video is counted and recorded as advertising duration. The preset time interval is determined based on all the counted advertising durations. For example, the advertisement duration with the longest time length among all the counted advertisement durations may be configured as the preset time interval. Or, the average value of all the counted advertisement durations may be calculated and configured as the preset time interval.

In addition, a user level currently logged in to the client may be determined. The preset time interval may be configured based on the user level. Specifically, whether the user level is a preset level may be determined. When the user level is the preset level, the preset time interval may be configured as a first time length. When the user level is not the preset level, the preset time interval may be configured as a second time length. The first time length may be less than the second time length. A user corresponding to the preset user level may have the right to skip the advertisement. The first time length may be a very small value, for example, 0 to 2 seconds. Specifically, the first time length may be 1 second.

In addition, the preset time interval is a time interval between the ending time of the advertisement and the playing start time. Or, the preset time interval is a time interval between the ending time of the beginning part corresponding to the video file to be played and the playing start time. The ending time of the advertisement may be obtained by referring to the above-mentioned embodiments, and the ending time of the beginning part corresponding to the video file to be played may be configured based on input by the user. The beginning part may be an opening song or an opening advertisement embedded in the video file to be played. For example, the beginning part may be a publicity advertisement of a movie company or sponsor of the movie.

When performing video enhancement processing on the video file to be played, the playing start time is recorded. The playing start time may be the time when the user clicks the play button of the video file to be played for the first time. The playing time point of each video frame in the video file to be played may be obtained according to the playing order of each frame and the frame frequency. For example, the frame frequency is 10 frames per second, that is, 10 frames of images can be played per second. Then the playing time point of the first frame is the playing start time+0.1 second, the playing time point of the second frame is the playing start time+0.2 seconds, and so on. The playing time point of each frame of image can be thus obtained. Assuming that the preset time interval is 60 seconds, video frames corresponding to a time period from the playing start time to the playing start time+60 seconds is not performed with the video enhancement processing. Video frames corresponding to the playing time point within the time period after the playing start time+60 seconds are recorded as the video frames to be processed.

At block S805: Video enhancement processing is performed on the target video frames.

At block S806: A target video stream is obtained by synthesizing all video frames and the subtitle stream.

At block S807: The target video stream is displayed on a display screen.

It should be noted that, for parts that are not described in detail in the foregoing operations, reference may be made to the foregoing embodiments, and details are not repeated here.

Figure 9:
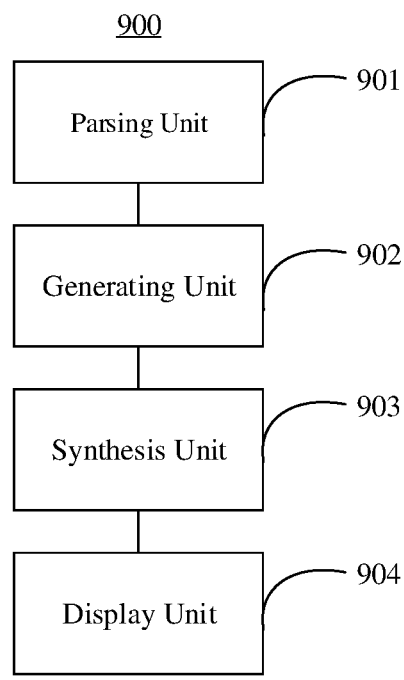
FIG. 9 is a block view of a video processing apparatus according to an embodiment of the present disclosure.

Referring to FIG. 9, FIG. 9 is a block view of a video processing apparatus 900 according to an embodiment of the present disclosure. The apparatus 900 may include: a parsing unit 901, a generating unit 902, a synthesis unit 903, and a display unit 904.

The parsing unit 901 is configured to parse a video file to be played to obtain an audio stream and a video stream, the video file to be played being an online video.

The generating unit 902 is configured to generate a subtitle stream based on the audio stream.

Specifically, the generating unit 902 is further configured to invoke the CPU to convert the audio stream to the subtitle stream.

The synthesis unit 903 is configured to synthesize the subtitle stream and the video stream into a target video stream.

The synthesis unit 903 is further configured to decode the video stream to obtain a plurality of video frames; perform video enhancement processing on the plurality of video frames; and synthesize the subtitle stream with the plurality of video frames after the video enhancement processing to obtain the target video stream.

Further, the synthesis unit 903 is further configured to invoke the GPU to decode the video stream to obtain the plurality of video frames.

Further, the synthesis unit 903 is also configured to obtain a resolution of the video file to be played; determine whether the resolution is greater than a first preset resolution; and in response to the resolution being greater than the first preset resolution, invoke the GPU to decode the video stream to obtain the plurality of video frames.

Further, the synthesis unit 903 is further configured to send the plurality of video frames to a off-screen rendering buffer; instruct the GPU to perform the video enhancement processing on the plurality of video frames in the off-screen rendering buffer; and send the subtitle stream and the plurality of video frames after the video enhancement processing to a frame buffer for synthesis to obtain the target video stream.

Further, the synthesis unit 903 is further configured to search for video frames to be processed among the plurality of video frames, wherein for each video frame to be processed, a time interval between a playing time point corresponding to the each video frame to be processed and a playing start time of the video file to be played is greater than a preset time interval; the preset time interval is a time interval between the ending time of the advertisement and the playing start time; or, the preset time interval is a time interval between the ending time of the beginning part corresponding to the video file to be played and the playing start time; to perform the video enhancement processing on the video frames to be processed; and synthesize all video frames with the subtitle stream to obtain the target video stream.

The display unit 904 is configured to display the target video stream on the display screen.

A person skilled in the art can clearly understand that, for the convenience and conciseness of description, the specific working process of the apparatus and module described above can refer to the corresponding process in the foregoing method embodiments, which will not be repeated here.

In the several embodiments provided in the present disclosure, coupling between the modules may be electrical, mechanical or other forms of coupling.

In addition, each functional module in each embodiment of the present disclosure may be integrated into one processing module, or each module may exist alone physically, or two or more modules may be integrated into one module. The above-mentioned integrated modules can be implemented in the form of hardware or software functional modules.

Figure 10:
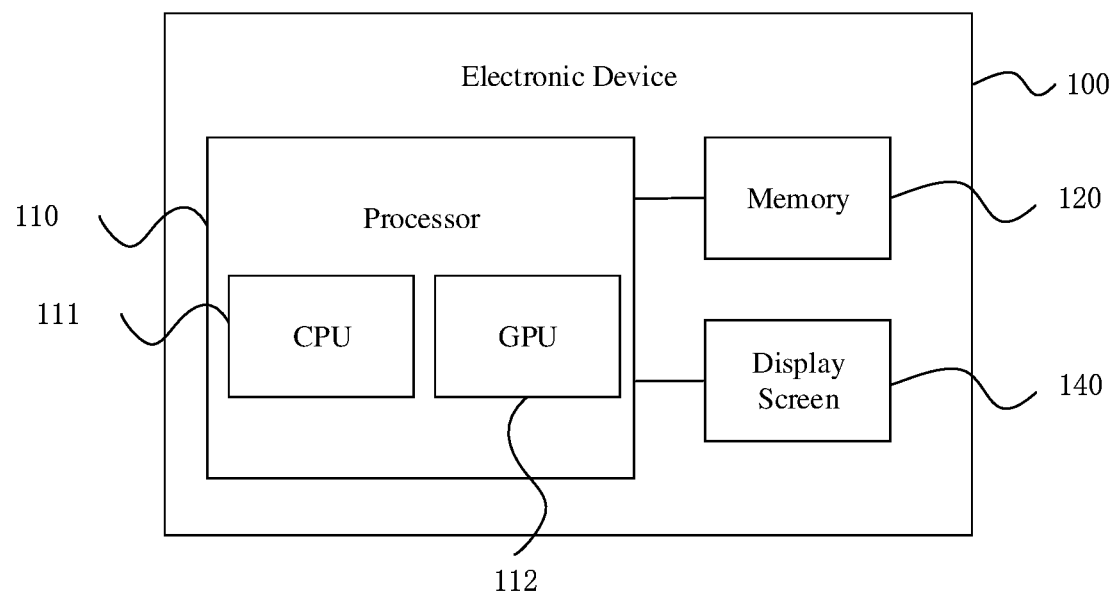
FIG. 10 is a structural block view of an electronic device according to an embodiment of the present disclosure.

Referring to FIG. 10, FIG. 10 is a structural block view of an electronic device according to an embodiment of the present disclosure. The electronic device 100 may be an electronic device capable of running application programs, such as a smart phone, a tablet computer, or an e-book. The electronic device 100 in the present disclosure may include one or more of the following components: a processor 110, a memory 120, a display screen 140, and one or more application programs. The one or more application programs may be stored in the memory 120 and configured to be executed by one or more processors 110. The one or more programs are configured to execute the methods described in the foregoing method embodiments.

The processor 110 may include one or more processing cores. The processor 110 is arranged various interfaces and lines to connect various parts of the entire electronic device 100. The processor 110 executes various functions and processing data of the electronic device 100 by running or executing instructions, programs, code sets, or instruction sets stored in the memory 120, and invoking data stored in the memory 120. Optionally, the processor 110 may be realized with at least one hardware form of digital signal processing (DSP), field-programmable gate array (FPGA), and programmable logic array (PLA).

Specifically, the processor 110 may include one or a combination of a CPU 111, a GPU 112, a modem, and the like. The CPU 111 mainly processes the operating system, user interface, and client, etc. The GPU 112 is configured for rendering and drawing of display content. The modem is configured for processing wireless communication. It can be understood that the above-mentioned modem may not be integrated into the processor 110, but may be implemented by a communication chip alone.

The memory 120 may include random access memory (RAM) or read-only memory (ROM). The memory 120 may be configured to store instructions, programs, codes, code sets or instruction sets. The memory 120 may include a program storage area and a data storage area. The program storage area may store instructions for implementing the operating system, instructions for implementing at least one function (such as touch function, sound playing function, image playing function, etc.), instructions for implementing the foregoing method embodiments, etc. The data storage area can also store data (such as phone book, audio and video data, chat record data) created by the electronic device 100 during use.

The display screen 120 is configured to display information input by the user, information provided to the user, and various graphical user interfaces of the electronic device. The graphical user interfaces can be composed of graphics, text, icons, numbers, videos, and any combination thereof. In an example, a touch screen may be arranged on the display panel to form an integral body with the display panel.

Figure 11:
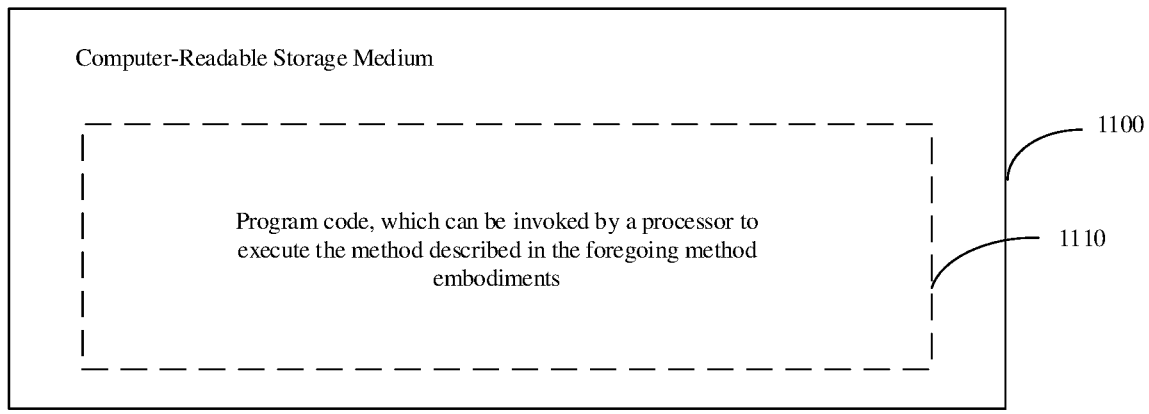
FIG. 11 is a schematic view of a storage unit configured to store or carry program code for implementing a video processing method according to an embodiment of the present disclosure.

Referring to FIG. 11, which shows a schematic view of a computer-readable storage medium according to an embodiment of the present disclosure. The computer-readable medium 1100 stores program code, and the program code can be invoked by a processor to execute the method described in the foregoing method embodiments.

The computer-readable storage medium 1100 may be an electronic memory such as flash memory, electrically erasable programmable read only memory (EEPROM), EPROM, hard disk, or ROM. Optionally, the computer-readable storage medium 1100 includes a non-transitory computer-readable storage medium. The computer-readable storage medium 1100 has storage space for the program code 1111 for executing any method operations in the above-mentioned methods. The program codes can be read from or written into one or more computer program products. The program code 1111 can be compressed in an appropriate form, for example.

Finally, it should be noted that the above embodiments are only to illustrate the technical solutions of the present disclosure, but not to limit the present disclosure. Although the present disclosure has been described in detail with reference to the foregoing embodiments, a person skilled in the art should understand that the technical solutions recorded in the foregoing embodiments may be modified, or some of the technical features may be equivalently replaced. The modifications or replacements do not drive the essence of the corresponding technical solutions to deviate from the spirit and scope of the technical solutions of the embodiments of the present disclosure.

What is claimed is:

1. A video processing method for an electronic device; wherein the electronic device comprises a display screen, a central processing unit (CPU), and a graphics processing unit (GPU); the video processing method comprises:
    obtaining an audio stream and a video stream by parsing a video file; wherein the video file is an online video;
    generating a subtitle stream based on the audio stream by invoking the CPU to convert the audio stream to the subtitle stream;
    obtaining a target video stream by synthesizing the subtitle stream and the video stream; and
    displaying the target video stream on the display screen;
    wherein obtaining the target video stream by synthesizing the subtitle stream and the video stream comprises:
        obtaining a plurality of video frames by decoding the video stream;
        performing video enhancement processing on the plurality of video frames to obtain a plurality of enhanced video frames; and
        obtaining the target video stream by synthesizing the subtitle stream and the plurality of enhanced video frames; and
    wherein obtaining the plurality of video frames by decoding the video stream comprises:
        obtaining a resolution of the video file;
        obtaining a utilization rate of the CPU in response to the resolution of the video file being less than or equal to a first preset resolution; and
        in response to the utilization rate of the CPU being less than the preset value, obtaining the plurality of video frames by invoking the GPU to decode the video stream.

2. The video processing method according to claim 1, wherein before obtaining the plurality of video frames by invoking the GPU to decode the video stream, the video processing method further comprises: obtaining the utilization rate of each of currently launched applications in response to the utilization rate of the CPU being less than the preset value; determining that at least one of the currently launched applications is a preset application, wherein the preset application is capable of being closed by a system of the electronic device without authorization from a user; closing the currently launched application being the preset application; obtaining a current utilization rate of the CPU as the utilization rate of the CPU; and returning and performing the determining whether the utilization rate of the CPU is less than the preset value again, and obtaining a determination current result as a target determination result.

3. The video processing method according to claim 1, further comprising:
    in response to the utilization rate of the CPU being greater than or equal to the preset value, obtaining the plurality of video frames by invoking the GPU or the CPU to decode the video stream.

4. The video processing method according to claim 1, wherein obtaining the plurality of video frames by invoking the GPU to decode the video stream comprises:
    obtaining a resolution of the video file;
    in response to the resolution of the video file being greater than the first preset resolution, obtaining the plurality of video frames by invoking the GPU to decode the video stream.

5. The video processing method according to claim 1, wherein performing the video enhancement processing on the plurality of video frames to obtain a plurality of enhanced video frame and obtaining the target video stream by synthesizing the subtitle stream and the plurality of enhanced video frames comprise:
    sending the plurality of video frames to an off-screen rendering buffer;
    instructing the GPU to perform the video enhancement processing on the plurality of video frames in the off-screen rendering buffer; and
    sending the subtitle stream and the plurality of enhanced video frames to a frame buffer and obtaining the target video stream by synthesizing the subtitle stream and the plurality of enhanced video frames.

6. The video processing method according to claim 1, wherein performing the video enhancement processing on the plurality of video frames to obtain a plurality of enhanced video frames and obtaining the target video stream by synthesizing the subtitle stream and the plurality of video frames comprise:
  searching for target video frames among the plurality of video frames; wherein for each target video frame, a time interval between a playing time point of the each target video frame and a playing start time of the video file is greater than a preset time interval; the preset time interval is between an ending time of an advertisement and the playing start time; or, the preset time interval is between an ending time of an opening song of the video file and the playing start time;
  performing the video enhancement processing on the target video frames; and
  obtaining the target video stream by synthesizing all video frames and the subtitle stream.

7. The video processing method according to claim 1, wherein performing the video enhancement processing on the plurality of video frames comprises:
  optimizing image parameters on the plurality of video frames.

8. The video processing method according to claim 7, wherein optimizing image parameters comprises at least one optimization item of image parameters; the optimizing image parameters on the plurality of video frames comprises:
  in response to the resolution of the video file being less than a second preset resolution, configuring a first optimization strategy for the video file; and
  in response to the resolution of the video file being greater than or equal to the second preset resolution, configuring a second optimization strategy for the video file; wherein an optimization level of each optimization item in the first optimization strategy and an optimization level of a corresponding optimization item in the second optimization strategy are different.

9. The video processing method according to claim 8, wherein the at least one optimization item of image parameters comprises at least one of exposure enhancement, denoising, edge sharpening, contrast increase, and saturation increase; an optimization level of the denoising in the first optimization strategy is higher than the optimization level of the denoising in the second optimization strategy; an optimization level of the edge sharpening in the first optimization strategy is higher than the optimization level of the edge sharpening in the second optimization strategy; an optimization level of the saturation increase in the first optimization strategy is lower than the optimization level of the saturation increase in the second optimization strategy.

10. The video processing method according to claim 7, wherein optimizing image parameters comprises at least one optimization item for image parameters; the optimizing image parameters on the plurality of video frames comprises:
  in response to the resolution of the video file being less than the second preset resolution, configuring a third optimization strategy for the video file; and
  in response to the resolution of the video file being greater than or equal to the second preset resolution, configuring a fourth optimization strategy for the video file; wherein the third optimization strategy comprises denoising and edge sharpening; the fourth optimization strategy comprises saturation increase.

11. The video processing method according to claim 6, wherein prior to searching for the target video frames among the plurality of video frames, the video processing method further comprises:
  obtaining a user level;
  in response to the user level being the preset level, configuring the preset time interval as a first time length; and
  in response to the user level being not the preset level, configuring the preset time interval as a second time length; wherein the first time length is less than the second time length.

12. The video processing method according to claim 6, wherein before searching for the target video frames among the plurality of video frames, the video processing method further comprises:
  obtaining a duration of advertisement content added to each video as an advertisement duration of the each video; and
  determining the preset time interval based on all the advertisement durations.

13. The video processing method according to claim 12, wherein determining the preset time interval based on all the advertisement durations comprises:
  configuring an advertisement duration with longest time length among all the advertisement durations as the preset time interval.

14. The video processing method according to claim 12, wherein determining the preset time interval based on all the advertisement durations comprises:
  configuring an average value of all the advertisement durations as the preset time interval.

15. The video processing method according to claim 5, wherein displaying the target video stream on the display screen comprises:
  instructing the GPU to read image data from the frame buffer frame by frame according to a refresh frequency of the display screen; and
  displaying the image data on the display screen after rendering and synthesis processing.

16. An electronic device, comprising:
  a display screen;
  a central processing unit (CPU);
  a graphics processing unit (GPU);
  at least one processor; and
  at least one memory including program code;
  the at least one memory and the program code are configured to, with the at least one processor, cause the electronic device to perform:
    obtaining an audio stream and a video stream by parsing a video file; wherein the video file is an online video;
    generating a subtitle stream based on the audio stream by invoking the CPU to convert the audio stream to the subtitle stream;
    obtaining a target video stream by synthesizing the subtitle stream and the video stream; and
    displaying the target video stream on the display screen,
    wherein obtaining the target video stream by synthesizing the subtitle stream and the video stream comprises:
      obtaining a plurality of video frames by decoding the video stream;
      performing video enhancement processing on the plurality of video frames to obtain a plurality of enhanced video frames; and obtaining the target video stream by synthesizing the subtitle stream and the plurality of enhanced video frames; and wherein obtaining the plurality of video frames by decoding the video stream comprises:
  obtaining a resolution of the video file;
  obtaining a utilization rate of the CPU in response to the resolution of the video file being less than or equal to a first preset resolution; and
  in response to the utilization rate of the CPU being less than the preset value, obtaining the plurality of video frames by invoking the GPU to decode the video stream.

17. A non-transitory computer-readable storage medium, comprising program code stored thereon for performing at least the following:
  obtaining an audio stream and a video stream by parsing a video file; wherein the video file is an online video;
  generating a subtitle stream based on the audio stream by invoking a central processing unit (CPU) to convert the audio stream to the subtitle stream;
  obtaining a target video stream by synthesizing the subtitle stream and the video stream; and
  displaying the target video stream on a display screen,
  wherein obtaining the target video stream by synthesizing the subtitle stream and the video stream comprises:
    obtaining a plurality of video frames by decoding the video stream;
    performing video enhancement processing on the plurality of video frames to obtain a plurality of enhanced video frames; and
    obtaining the target video stream by synthesizing the subtitle stream and the plurality of enhanced video frames; and
  wherein obtaining the plurality of video frames by decoding the video stream comprises:
    obtaining a resolution of the video file;
    obtaining a utilization rate of the CPU in response to the resolution of the video file being less than or equal to a first preset resolution; and
    in response to the utilization rate of the CPU being less than the preset value, obtaining the plurality of video frames by invoking a graphics processing unit (GPU) to decode the video stream.

* * * * *